United States Patent
Ashey et al.

(10) Patent No.: US 7,142,319 B2
(45) Date of Patent: Nov. 28, 2006

(54) CUSTOMIZABLE PRINTER CONTROL PANEL

(75) Inventors: Brandon R. Ashey, Boise, ID (US);
Jeffrey C. Baird, Meridian, ID (US);
Michael P. Prenn, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 963 days.

(21) Appl. No.: 10/162,833

(22) Filed: Jun. 3, 2002

(65) Prior Publication Data

US 2003/0231327 A1 Dec. 18, 2003

(51) Int. Cl.
*G06F 3/12* (2006.01)
*G06F 9/44* (2006.01)

(52) U.S. Cl. .................... 358/1.15; 715/765
(58) Field of Classification Search ............... 358/1.15, 358/1.13, 442, 468; 715/765, 866
See application file for complete search history.

(56) References Cited

U.S. PATENT DOCUMENTS 5,790,279 A * 8/1998 Sakellaropoulos .......... 358/442
5,805,777 A * 9/1998 Kuchta ...................... 358/1.13
6,934,915 B1 * 8/2005 Rudd et al. .................. 715/765
2002/0105663 A1 * 8/2002 Pappalardo et al. ........ 358/1.12
2004/0130745 A1 * 7/2004 Fabel et al. ................ 358/1.15
2005/0216854 A1 * 9/2005 Rudd et al. .................. 715/765

OTHER PUBLICATIONS

Microsoft Corporation, "Getting Started: Microsoft Window 98", 1998, pp. 53-76.
Microsoft Corporation, "Consumer Companion to Window 98 Offers Expanded PC Maintenance And Exciting Entertainment Features", Apr. 29, 1998, 2 pages.
Hewlett-Packard Company, "User Guide: HP Embedded Web Server For HP LaserJet Printers", 2001, pp. 1-59.

* cited by examiner

*Primary Examiner*—Scott A. Rogers

(57) ABSTRACT

According to one aspect, a printer checks whether a customized control panel definition is available for the printer. If a customized control panel definition is available for the printer, then the customized control panel definition is retrieved, otherwise a default control panel definition is retrieved. A control panel as defined by the retrieved control panel definition is displayed. According to another aspect, a request to customize control panel of a printer is received. Control panel customization options are displayed, one or more control panel customization selections are received, and a control panel definition for the printer that incorporates the control panel customization selections is saved.

28 Claims, 6 Drawing Sheets

CUSTOMIZABLE PRINTER CONTROL PANEL

TECHNICAL FIELD

This invention relates generally to printing devices, and more particularly to a customizable printer control panel.

BACKGROUND

As computer technology has advanced, so too has the technology of peripheral devices used by computers, such as printers which allow users to generate hard copies (e.g., paper copies) of documents supplied to the printer by a computer. Many printers have control panels that allow users to set various printer parameters (such as duplex/simplex printing, number of copies, print quality, default paper tray, etc.) as well as perform various diagnostic operations (e.g., run self-tests). These control panels also have an accompanying interface that allows users to interact with the control panel display, such as keypads, touchscreens, etc. The complexity of these control panels can vary, ranging from single-line LED displays to color graphical user interfaces displayed on LCDs.

However, some problems exist with these control panels. One such problem is that purchasers of printers with control panels are restricted to the "look-and-feel" of the control panel designed by the printer manufacturer. This restriction reduces the user-friendliness of the printer. Thus, it would be beneficial to provide a way to improve the user-friendliness of the printer.

The customizable printer control panel described herein helps solve these problems.

SUMMARY

A customizable printer control panel is described herein.

According to one aspect, a printer checks whether a customized control panel definition is available for the printer. If a customized control panel definition is available for the printer, then the customized control panel definition is retrieved, otherwise a default control panel definition is retrieved. A control panel as defined by the retrieved control panel definition is displayed.

According to another aspect, a request to customize control panel of a printer is received. Control panel customization options are displayed, one or more control panel customization selections are received, and a control panel definition for the printer that incorporates the control panel customization selections is saved.

DETAILED DESCRIPTION

A customizable printer control panel is described herein. A user can generate a custom printer control panel definition for a printer (e.g., which describes a control panel having a look-and-feel desired by the user). The printer uses the custom printer control panel definition to generate its control panel display if the custom definition is available; otherwise, the printer uses a default printer control panel definition to generate its control panel display.

Figure 1:
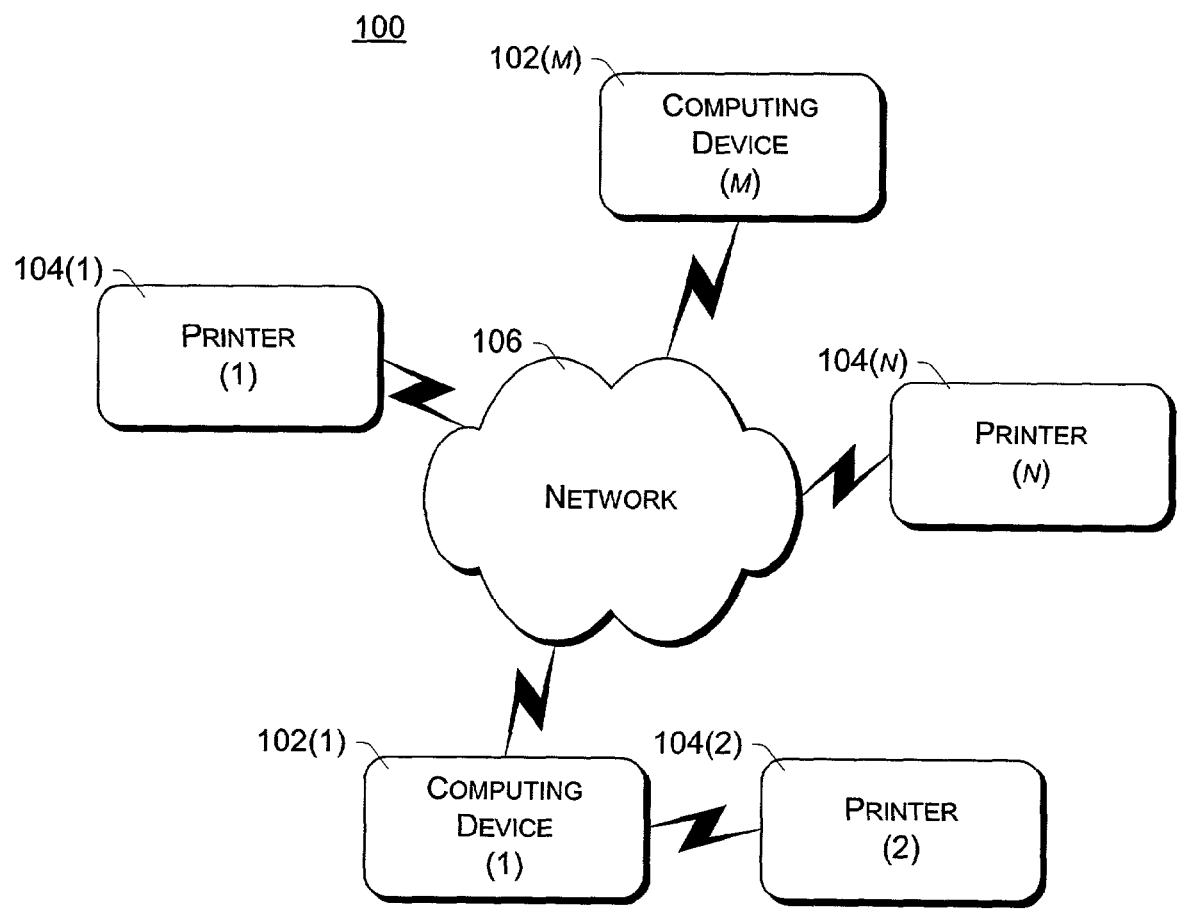
FIG. 1 illustrates an exemplary environment in which the customizable printer control panel can be employed.

FIG. 1 illustrates an exemplary environment 100 in which the customizable printer control panel can be employed. In environment 100, multiple (m) computing devices 102 are coupled to one or more of multiple (n) printers 104 via a network 106 and/or directly. Network 106 is intended to represent any of a wide variety of conventional network topologies and types (including wired and/or wireless networks), employing any of a wide variety of conventional network protocols (including public and/or proprietary protocols).

Computing devices 102 can be any of a wide variety of conventional computing devices, including desktop PCs, workstations, server computers, Internet appliances, gaming consoles, handheld PCs, cellular telephones, personal digital assistants (PDAs), etc. Computing devices 102 can be the same types of devices, or alternatively different types of devices.

Printers 104 can be any of a wide variety of devices capable of generating a hard copy of data (e.g., received from one of computing devices 102). Printers 104 can generate hard copies of data in any of a variety of manners, such as by using toner (e.g., in laser printers), ink (e.g., in inkjet printers, bubblejet printers, dot matrix printers, etc.), heat applied to heat-sensitive print media (e.g., thermal printers), and so forth. Printers 104 can be the same types of devices, or alternatively different types of devices. Printers 104 may also incorporate additional functionality, such as the ability to scan hard copies of documents and generate digital representations of such documents, send and/or receive data as a facsimile machine, and so forth.

Figure 2:
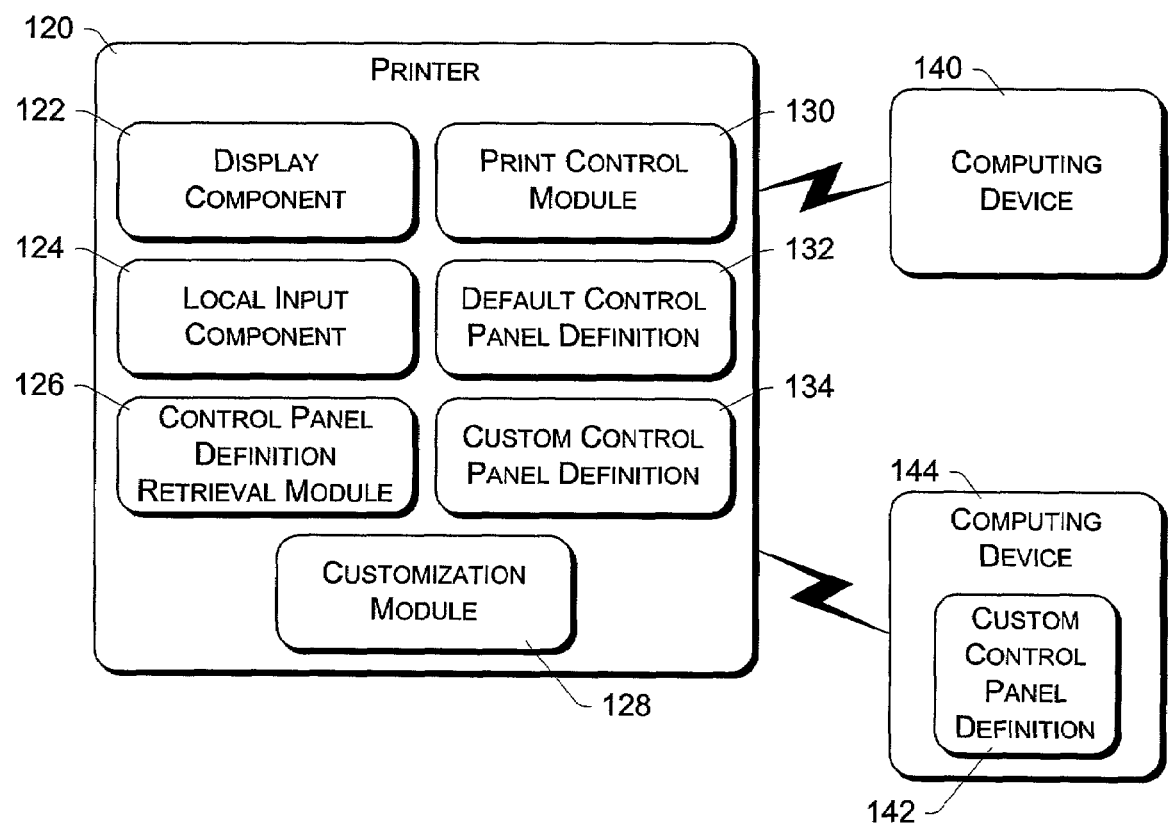
FIG. 2 is a block diagram illustrating an exemplary printer in additional detail.

FIG. 2 is a block diagram illustrating an exemplary printer 120 in additional detail. Printer 120 can be any of printers 104 of FIG. 1. Printer 120 includes several modules or components: display component 122, local input component 124, a control panel definition retrieval module 126, a customization module 128, a print control module 130, a default control panel definition 132, and a custom control panel definition 134. The components and modules in FIG. 2 are exemplary only; the exact components and modules included in any particular printer can vary.

Display component 122 displays a printer control panel as defined by a control panel definition. Display component 122 may include any of a variety of conventional display devices, such as an LED screen, a color or monochrome LCD screen, etc. Local input component 124 allows users to input information to printer 120 locally. Local input component 124 may include, for example, one or more buttons or keys, cursor control devices (e.g., a trackball, trackpad, directional keys, etc.), a touchscreen, etc. Components 122 and 124 may also include software, firmware, and/or hardware modules to allow management and control of the corresponding hardware components (e.g., display screen, keypad, etc.). Components 122 and 124 allow a local user of printer 120 (e.g., a user standing at printer 120 rather than accessing printer 120 via a network) to interact with printer 120.

Print control module 130 manages the printing of data by printer 120 in a conventional manner in order to generate a hard copy of the data. Print requests can be received from a computing device 140 via a network (e.g., network 106 of FIG. 1) and/or directly from computing device 140.

Control panel definition retrieval module 126 manages the retrieval of a control panel definition for use by display component 122 in generating the control panel display. Module 126 makes the retrieved control panel definition available to display component 122, and can do so in any of a variety of different manners. For example, module 126 may save the retrieved definition to a particular portion of memory (e.g., range of memory addresses) expected by display component 122, or invoke a function of component 122 passing the function a data structure including the retrieved definition, or passing component 122 a parameter identifying a location (e.g., memory address(es) or other identifier(s)) where the retrieved definition can be found, etc.

Retrieval module 126 initially attempts to retrieve a custom control panel definition for printer 120. A custom control panel definition may be stored locally at printer 120 (e.g., as custom control panel definition 134) in a nonvolatile memory component of printer 120 (e.g., a hard disk, Flash memory, etc.). In this situation, retrieval module 126 retrieves the custom control panel definition locally at printer 120. A custom control panel definition may also be stored remotely from printer 120, such as custom control panel definition 142 stored on a memory (typically nonvolatile) of computing device 144. Retrieval module 126 is configured with the information identifying one or more locations where the custom control panel definition may be located, and thus knows where to look for the definition. The location identifying information may be one or more network addresses, URLs (Uniform Resource Locators), etc. Module 126 may be pre-programmed with this identifying information, or alternatively may have a user-configurable setting that allows the user to enter this identifying information (e.g., from a remote device, locally via local input component 124, etc.).

Retrieval module 126 may access multiple different locations in an attempt to locate a custom control panel definition. For example, module 126 may initially check whether a custom control panel definition is available locally on printer 120, and if so then use that definition. However, if no definition is available locally, then module 126 may check one or more remote computing devices 144 in an attempt to locate a custom control panel definition. The order in which retrieval module 126 accesses the different locations may be programmed in to module 126, or alternatively may follow some other methodology (e.g., random selection, alphabetical by name, in a particular order of network addresses, etc.).

Retrieval module 126 may also have access to a flag (or alternatively some other indicator), the value of which identifies to module 126 that a custom control panel definition has been created for printer 120. If the flag value indicates that no custom control panel definition has been created for printer 120, then retrieval module 126 knows that it need not attempt to find a custom control panel definition for printer 120.

A custom printer control panel definition may be explicitly or implicitly associated with printer 120. A definition may be explicitly associated with printer 120 by having a mapping of the definition (or identifier of the definition) to an identifier of the printer (e.g., the network address of printer 120, a serial number of printer 120, a name of printer 120, etc.). This allows, for example, computing device 144 to maintain multiple custom control panel definitions for multiple printers and have each printer obtain the appropriate definition (the definition mapped to the printer) from device 144.

A custom printer control panel definition may also be implicitly associated with printer 120. For example, a particular memory address or range may be associated with printer 120. Retrieval module 126 can thus retrieve the contents at this memory address or range and know that the contents are the custom printer control panel definition for printer 120. By way of another example, custom printer control panel definitions may be saved under particular file names. Retrieval module 126 can be configured with the file name of the control panel definition to retrieve, and thus retrieve the appropriate custom control panel definition for printer 120.

In some situations, a custom control panel definition may not be available to retrieval module 126 and thus is not retrieved. Such situations may arise for numerous reasons. One such situation is that a custom control panel definition may not exist for printer 120 (e.g., it may not have been created yet), in which case there is no definition to retrieve. Another situation is that the device from which the custom control panel definition is to be retrieved (e.g., remote computing device 144) may not be accessible because it is not operational (e.g., it may have crashed, may have been turned off, etc.). Yet another situation is that there may be communications problems between printer 120 and the device from which the custom control panel definition is to be retrieved that make the definition inaccessible (e.g., there may be a network problem, printer 120 may be disconnected from the network, the device storing the custom control panel definition may be disconnected from the network, etc.). If no custom control panel definition is available, then retrieval module 126 retrieves default control panel definition 132.

Retrieval module 126 can operate to retrieve a control panel definition at a variety of different times. In one implementation, each time printer 120 is powered-on (e.g., turned on), printer 120 goes through a boot sequence in which it loads any necessary software from nonvolatile memory, displays the control panel, warms up any necessary hardware, etc. As part of this boot sequence, retrieval module 126 retrieves the control panel definition. It should be noted that this power-on boot sequence may be power-on from a no-power state or any of a variety of low-power (power-save) states.

Retrieval module 126 may also operate to retrieve a control panel definition at different times. For example, printer 120 may have a reset option (e.g., a hardware button, a selection on the control panel, a command that can be sent from a remote device, etc.). Retrieval module 126 may retrieve a control panel definition each time the reset option is activated. Additionally, retrieval module 126 may be activated in response to other commands (e.g., due to functions exposed by module 126), which can be input in a variety of different manners (e.g., via the control panel, from a remote device, etc.).

Figure 3:
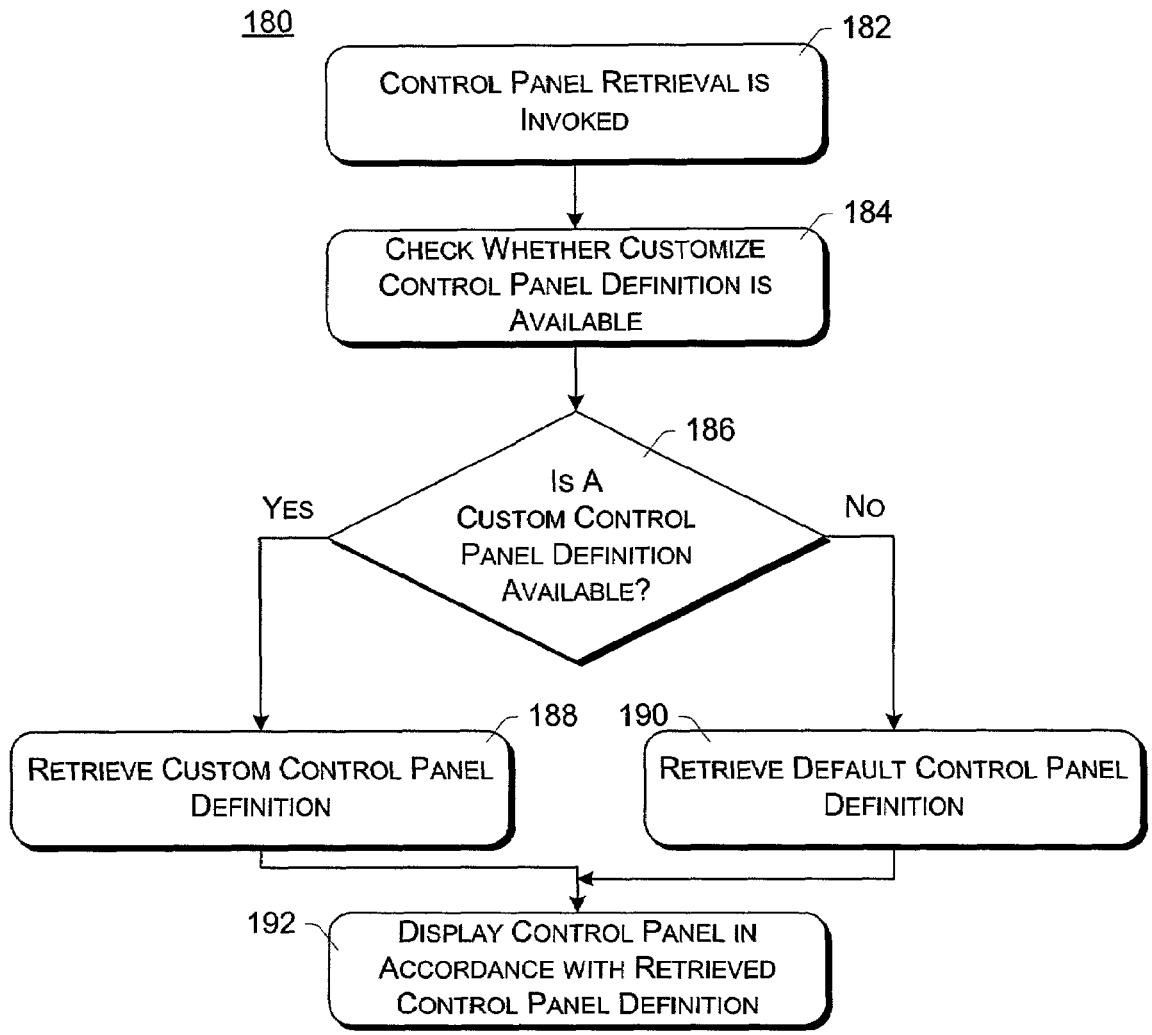
FIG. 3 is a flowchart illustrating an exemplary process for loading a printer control panel definition.

FIG. 3 is a flowchart illustrating an exemplary process 180 for loading a printer control panel definition. Process 180 is performed by a printer (e.g., printer 120 of FIG. 2), and may be performed in software, firmware, hardware, or combinations thereof.

Initially, the control panel definition retrieval process is invoked (act 182). A check is made for whether a custom control panel definition is available for the printer (act 184) and process 180 proceeds based on whether a custom control panel definition is available for the printer (act 186). If a custom control panel definition is available, then the custom control panel definition is retrieved (act 188). However, if a custom control panel definition is not available, then the default control panel definition is retrieved (act 190). A control panel is then displayed at the printer in accordance with (as defined by) the retrieved control panel definition (act 192).

Returning to FIG. 2, the custom control panel definition can describe any of a wide variety of characteristics of the control panel to be displayed at printer 120. The custom control panel definition allows a user to customize the look-and-feel of the control panel to his or her liking. Typically, the user doing the customizing is doing so on behalf of the manufacturer of printer 120 or on behalf of the purchaser of printer 120 (e.g., a system administrator). The user may optionally create and select for use multiple different custom control panel definitions (e.g., by making the appropriate definition available in the location expected by retrieval module 126).

A wide variety of different characteristics of the control panel can be customized. Examples of such characteristics include: the background color or pattern of the control panel, a font type or size for characters displayed on the control panel, a color for scroll bars, what particular tabs or buttons on the control panel should look like (e.g., shape, size, color, etc.) and/or what content they should include (e.g., what text label), one or more logos (e.g., a logo of the manufacturer, a logo of the purchaser, etc.), and so forth. Any characteristic of the control panel related to the appearance or look-and-feel of the control panel can be customized.

The manner in which the custom control panel definition is generated can vary based on the printer and the type of definition expected by display component 122. As discussed above, display component 122 is configured to display a control based on a control panel definition—whatever data structure or data form is expected by display component 122 is the data structure or data form which the custom definition takes.

Figure 4:
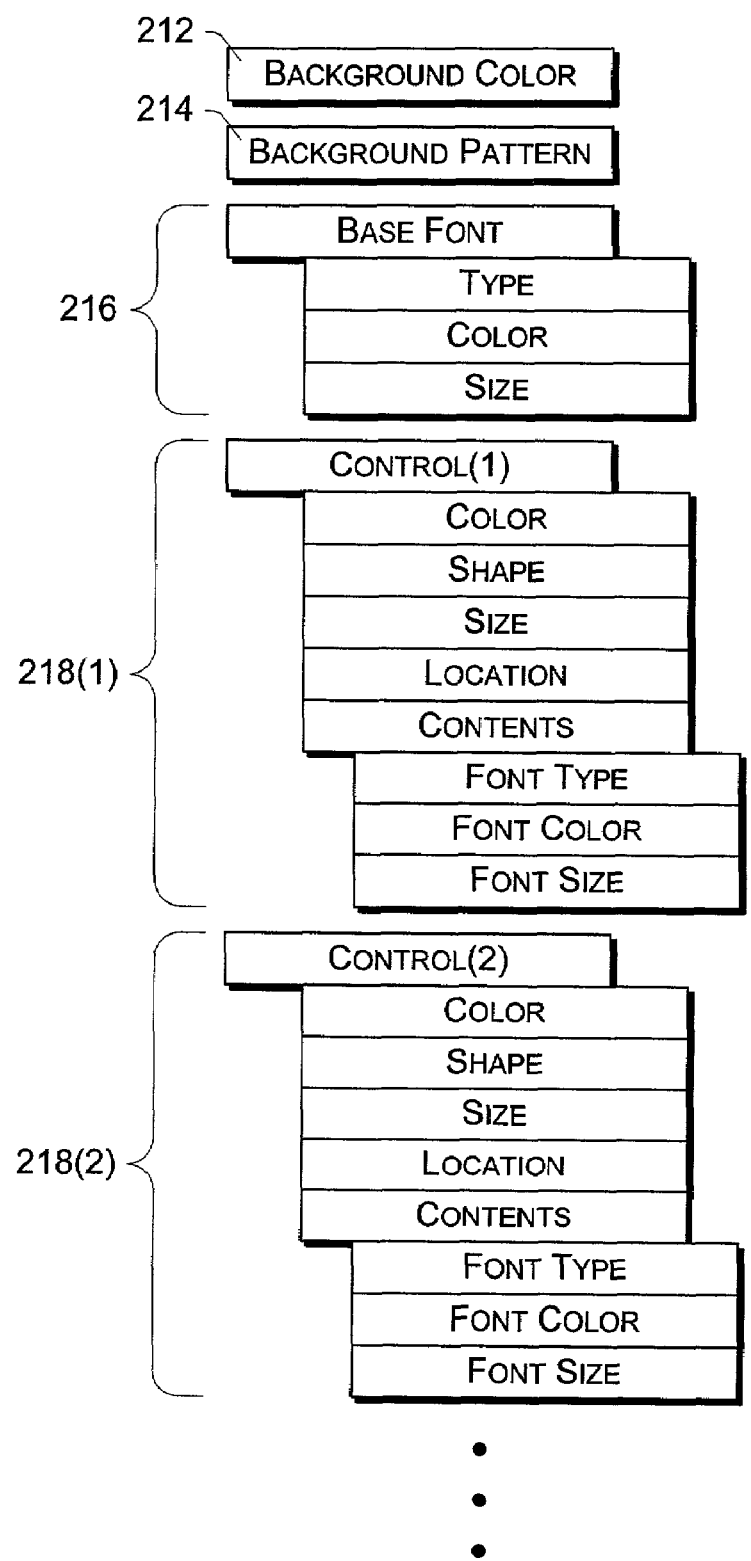
FIG. 4 illustrates an exemplary structure which can be used as a control panel definition.

FIG. 4 illustrates an exemplary structure 210 which can be used as a control panel definition. It is to be appreciated that structure 210 is exemplary only, and that other structures can also be used.

Structure 210 includes a background color field 212 in which an identification (e.g., alphanumeric code) of the color for the background is listed, and a background pattern field 214 in which an identification (e.g., alphanumeric code) of the pattern for the background is listed. A set of fields 216 are included that allow a base font (e.g., the default font to use unless overridden by a control, discussed below) to be customized, including the font type, the font color, and the font size.

One or more additional field sets 218 can also be included that allow an individual control within the control panel to be defined. Such a control, when displayed as part of the control panel, can be user-selectable (e.g., a button or tab that changes a particular printer setting, a button or tab that allows additional tabs to be displayed allowing the user to make different selections, etc.). Alternatively, such a control may not be user-selectable (e.g., may simply be an image, such as a manufacturer's logo or purchaser's logo). As illustrated, a wide variety of characteristics may be set for each control, such as the color, shape, size, location (which may be an absolute position, such as an x,y coordinate, or a relative position, such as a reference to another control), contents (which may be the actual contents, such as alphanumeric characters, or an identifier of where the contents are located, such as a URL or other identifier of an image file), font type for the contents, font color for the contents, font size for the contents, etc. Additionally, each control may include one or more other controls.

Figure 5:
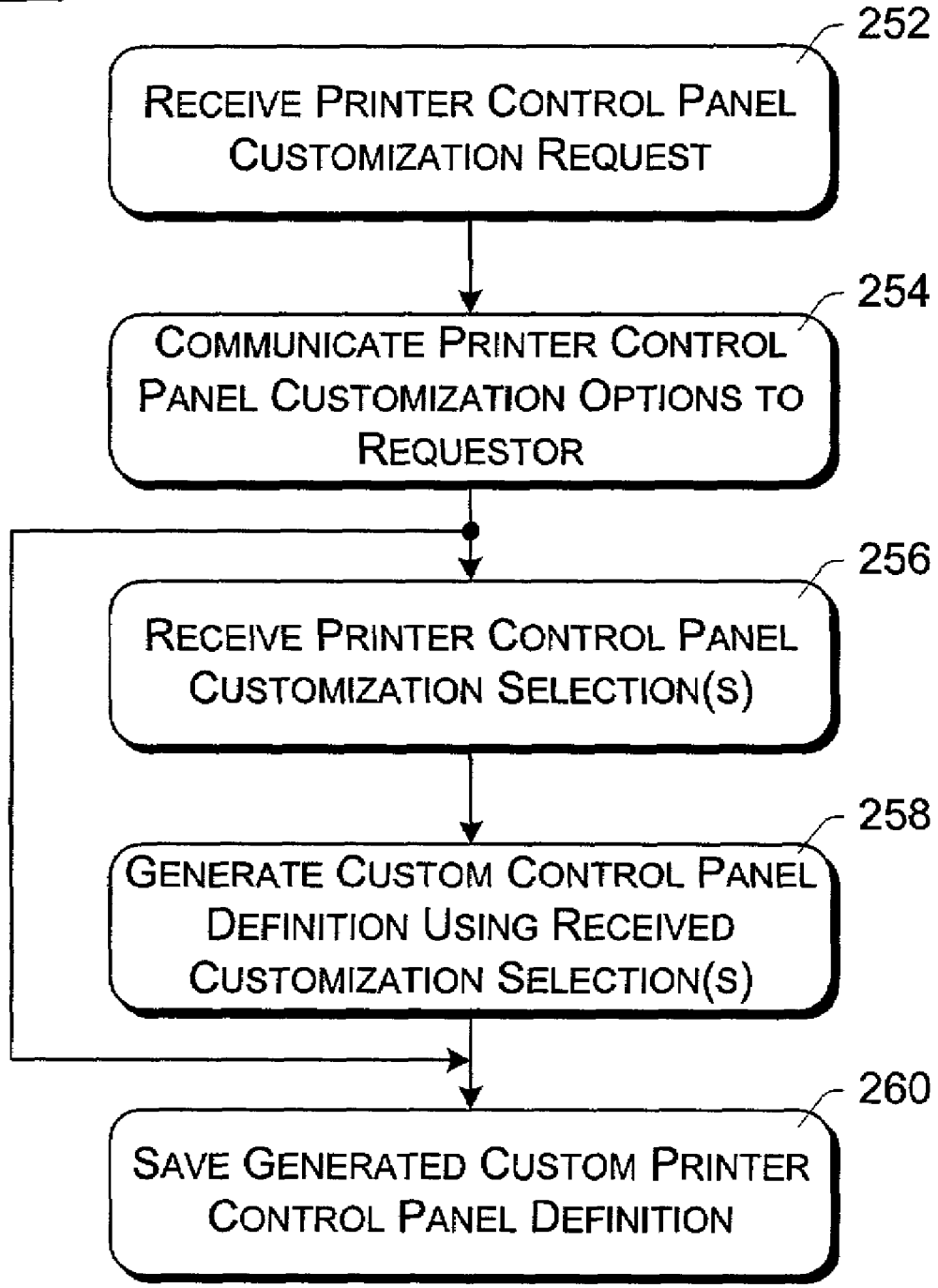
FIG. 5 is a flowchart illustrating an exemplary process for generating a custom printer control panel definition.

FIG. 5 is a flowchart illustrating an exemplary process 250 for generating a custom printer control panel definition. Process 250 may be performed in software, firmware, hardware, or combinations thereof.

Initially, a printer control panel customization request is received (act 252). Printer control panel customization options are communicated to the requestor (act 254), and one or more printer control panel customization selections are received (act 256). A custom control panel definition is generated using the received customization selection(s) (act 258), and the generated custom printer control panel definition is saved (act 260). The custom printer control panel definition can be generated (act 258) at the device that received the customization request, or alternatively at the requester.

The customization options and customization selections can vary, and can utilize any of a wide variety of techniques. For example, control panel characteristics may be selected and set via radio buttons, pull-down menus, tabs or buttons, data entry fields, etc. Characteristics may be set using "drag and drop" techniques (e.g., a palette from which a color (or shape, or pattern, or font size or shape, etc.) can be selected and dragged to a representation of a characteristic). An import option may be used so that previously generated images or graphics can be included (e.g., "gif" files, bitmap files, JPEG images, etc.). Additionally, the user that is inputting selections may be presented with a preview screen of what the control panel will look like based on the user's selections.

The customization process may start from a "blank slate" (e.g., no characteristics having been set), or alternatively may start from a default control panel definition (such as default control panel definition 132 of FIG. 2) and have one or more characteristics modified by the user.

In receiving a printer control panel customization request (act 252), additional verification procedures may also be implemented. For example, the requestor may be required to provide a password or ID/password combination from the user (which may be based in part on the device being used by the user) that can be verified by the device receiving the request (verified by the device directly, or by access a remote device to perform the verification on behalf of the device). If the device can verify that the user is permitted to customize the control panel of the printer (e.g., the password or ID/password combination satisfy a list of valid passwords or ID/password combinations), then process 250 proceeds with act 254; otherwise, the customization process 250 ends.

Process 250 may be performed by a computing device, a printer, or a combination of printer and computing device. In situations where process 250 is performed by a computing device, the computing device may be coupled to the printer for which the custom printer control panel definition is being generated (e.g., device 140 of FIG. 2) or alternatively may not be coupled to the printer (e.g., performed on an in-house computing device at the located in an office of the printer manufacturer). In this situation, the request of act 252 can be a user-request or request of another program on the computing device, the customization selection(s) of act 256 are made by the user, and the custom printer control panel definition is generated at the computing device. The generated definition can subsequently be transferred to another location accessible to the printer for retrieving by the printer. For example, the custom printer control panel definition for a printer may be created by a manufacturer of the printer and delivered to the purchaser along with the printer.

In situations where process 250 is performed by the printer (e.g., customization module 128 of FIG. 2), the request of act 252 can be a user-request, the customization options are communicated to the requestor (the user) via display component 122, selection(s) can be made via local input component 124, and the definition generated and saved by customization module 128.

In situations where process 250 is performed by a combination of a printer and a computing device, customization module 128 operates as a server device while a component of a remote computing device (e.g., a web browser of device 140) operates as a client device. In one implementation, customization module 128 includes an embedded web server which can serve web pages (e.g., written in HTML (HyperText Markup Language)) to a computing device (e.g., via a HyperText Transport Protocol (HTTP) connection or communication channel). The request of act 252 is a request from the client device to the customization module 128 (e.g., at the initiation of a user of the client device), customization module 128 communicates the customization options to the client device in act 254 and receives selections from the client device (which in turned received the selections as user input at the client device) in act 256. Customization module 128 then generates the custom control panel definition in act 258 and saves it to an appropriate location in act 260. Alternatively, the client device may perform the custom control panel definition generation, based on user-input at the client device and return the generated definition to customization module 128 for storage, or the client device may store the generated definition in an appropriate location. By way of example, customization module 128 may serve a web page to the requesting client device, the web page including a script (e.g., a JavaScript(s), a Java applet(s), a Virtual Basic Script(s) (VBScript(s), etc) that executes to generate (and optionally store) a custom control panel definition based on user inputs to the web page.

Figure 6:
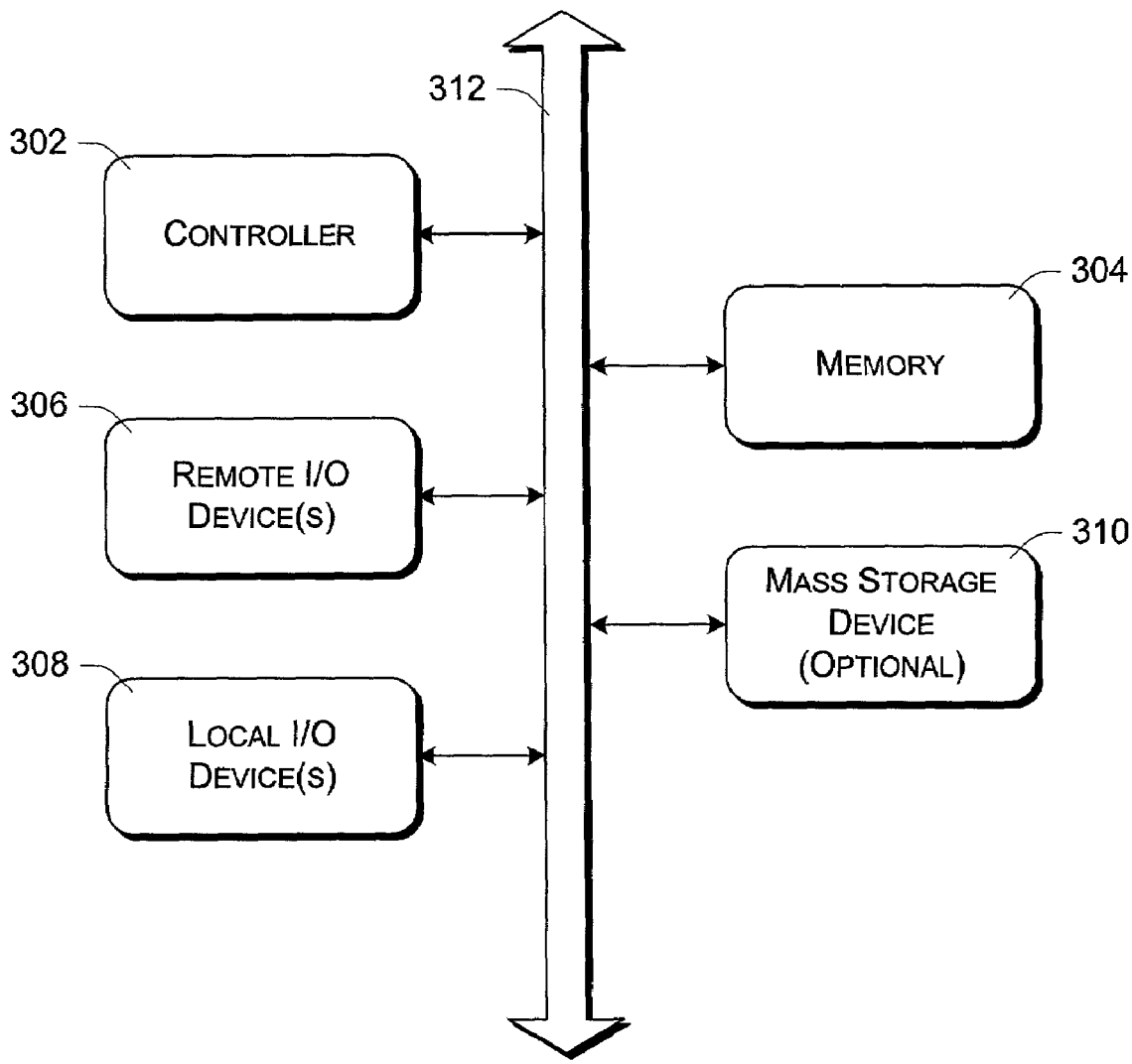
FIG. 6 illustrates portions of an exemplary device in additional detail.

FIG. 6 illustrates portions of an exemplary device 300 in additional detail. Device 300 can be, for example, a computing device 102 or printer 104 of FIG. 1, or printer 120 of FIG. 2. Device 300 includes a processor or controller 302, a memory 304, a remote I/O device(s) 306, a local I/O device(s) 308, and an optional mass storage device 310, all coupled to a bus 312. Depending on the type of the device, various additional conventional components may also be typically included in device 300 (e.g., a printing device will typically include a print engine, print media inputs and outputs, etc.).

Controller or processor 302 can be a general purpose microprocessor or a dedicated microcontroller (e.g., one or more Application Specific Integrated Circuits (ASICs) or programmable logic devices (PLDs)). Remote I/O device(s) 306 is one or more conventional interface devices allowing components of device 300 (e.g., controller 302) to communicate with other devices external to device 300. Remote I/O device(s) 306 may include, for example, a modem, a network interface card (NIC), a parallel port, a serial port, a universal serial bus (USB) port, and so forth. Local I/O device(s) 308 is an interface device allowing local commands and/or data to be input to and/or output from device 300. Local I/O device(s) 308 may include, for example, a display device (e.g., liquid crystal display (LCD), light emitting diode (LED), etc.), a keypad (e.g., alphanumeric or otherwise), a touchscreen, a cursor control device (e.g., a trackpad, trackball, etc.), print media handlers and printing components (e.g., ink or toner dispensers), and so forth.

Bus 312 represents one or more buses in printing device 300, which may be implemented in accordance with public and/or proprietary protocols. The bus architecture can vary by printing device as well as by manufacturer. Mass storage device 310 is optional and represents any of a wide variety of conventional storage devices, such as fixed or removable magnetic or optical disks, Flash memory, etc.

Memory 304 represents volatile and/or nonvolatile memory used to store instructions and data for use by controller or processor 302. Typically, instructions are stored on a mass storage device 310 (or nonvolatile memory portion of memory 304) and loaded into a volatile memory portion of memory 304 for execution by controller or processor 302. Additional memory components may also be involved, such as cache memories internal or external to controller or processor 302. Various embodiments of the invention may be implemented, at different times, in any of a variety of computer readable media that is part of, or readable by, device 300. For example, such computer readable media may be mass storage device 310, memory 304, a cache memory, media (e.g., a magnetic or optical disk) accessible to device 300, and so forth.

Device 300 is exemplary only. It is to be appreciated that additional components (not shown) can be included in device 300 and some components illustrated in device 300 need not be included. For example, additional processors or storage devices, additional I/O interfaces, and so forth may be included in device 300, or mass storage device 310 may not be included.

Various discussions herein refer to components and modules that can be implemented in a printing device or computing device. It is to be appreciated that the components and processes described herein can be implemented in software, firmware, hardware, or combinations thereof. By way of example, a programmable logic device (PLD) or application specific integrated circuit (ASIC) could be configured or designed to implement various components and/or processes discussed herein.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable media having stored thereon a plurality of instructions that, when executed by one or more controllers of a printer contained within a printer, causes the one or more controllers to:
    check whether a custom control panel definition is available for the printer;
    if a custom control panel definition is available for the printer, then retrieve the custom control panel definition, otherwise retrieve a default control panel definition; and
    display a control panel as defined by the retrieved control panel definition.

2. One or more computer readable media as recited in claim 1, wherein the custom control panel definition, when displayed, results in a control panel displayed with a user-defined look-and-feel.

3. One or more computer readable media as recited in claim 1, wherein the instructions that cause the one or more controllers to check whether a custom control panel definition is available for the printer comprise instructions that cause the one or more controllers to check a remote device remote from the printer to determine whether a custom control panel definition exists at the remote device.

4. One or more computer readable media as recited in claim 1, wherein the instructions that cause the one or more controllers to retrieve the custom control panel definition comprise instructions that cause the one or more controllers to retrieve the custom control panel from a remote device, and wherein the instructions that cause the one or more controllers to retrieve the default control panel definition comprise instructions that cause the one or more controllers to retrieve the default control panel definition from a local device.

5. One or more computer readable media as recited in claim 1, wherein the instructions that cause the one or more controllers to check whether a custom control panel definition is available for the printer comprise instructions that cause the one or more controllers to check a plurality of locations to determine whether a custom control panel definition exists.

6. One or more computer readable media as recited in claim 5, wherein the plurality of locations include a local location and a remote location.

7. One or more computer readable media as recited in claim 1, wherein the custom control panel definition includes both a logo of a manufacturer of the printer and a logo of a purchaser of the printer.

8. One or more computer readable media as recited in claim 1, wherein the instructions that cause the one or more controllers to check whether a custom control panel definition is available for the printer comprise instructions to check a flag that you to determine whether a custom control panel definition has been created for the printer, and to determine that a custom control panel definition is not available for the printer is the flag value indicates that the custom control panel definition has not been created for the printer.

9. A method, implemented by a printer, the method comprising:
checking whether a custom control panel definition exists for the printer;
retrieving the custom control panel definition if it exists;
retrieving a default control panel definition if the custom control panel definition does not exist; and
displaying a control panel based on the retrieved control panel definition.

10. A method as recited in claim 9, wherein the checking comprises checking a flag value to determine whether a custom control panel definition has been created for the printer.

11. A method as recited in claim 9, wherein retrieving the custom control panel definition comprises retrieving the custom control panel definition from a remote device, and were in retrieving the default control panel definition comprises retrieving the default control panel definition from a local device.

12. One or more computer readable media having stored thereon a plurality of instructions that, when executed by one or more processors of a printer, causes the one or more processors to:
receive a request to customize the control panel of the printer;
communicate control panel customization options to the requester;
receive one or more control panel customization selections from the requester; and
save a custom control panel definition for the printer, wherein the custom control panel definition incorporates the control panel customization selections.

13. One or more computer readable media as recited in claim 12, wherein the instructions that cause the one or more processors to communicate control panel customization options to the requester comprise instructions that cause the one or more processors to communicate a web page including control panel customization options to the requester.

14. One or more computer readable media as recited in claim 13, wherein the web page includes a script that can be executed by the requester to generate the custom control panel definition for the printer.

15. One or more computer readable media as recited in claim 12, wherein the requester comprises a remote computing device.

16. One more computer readable media as recited in claim 12, wherein the instructions that cause the one or more processors to save the custom control panel definition comprise instructions that cause the one or more processors to save the custom control panel definition to a remote computing device.

17. One or more computer readable media as recited in claim 12, wherein the plurality of instructions further include instructions that cause the one or more processors to use the received control panel customization selections to generate the custom control panel definition for the printer.

18. One or more computer readable media as recited in claim 12, wherein the a structures that cause the one or more processors to receive one or more control panel customization selections comprise instructions that cause the one or more processors to receive one or more control panel customization selections implicitly in the custom control panel definition received from the requester.

19. One or more computer readable media as recited in claim 12, wherein the customization options identify one or more characteristics of the control panel that can be customized.

20. One or more computer readable media as recited in claim 12, wherein the plurality of instructions further include instructions that cause the one or more processors to:
check whether the custom control panel definition is available for the printer,
if the custom control panel definition is available for the printer, then retrieve the custom control panel definition, otherwise retrieve a default control panel definition; and
display a control panel in accordance with the retrieved control panel definition.

21. One or more computer readable media as recited in claim 12, wherein the plurality of instructions further include instructions that cause the one or more processors to:
verify that the requester is permitted to customize the control panel of the printer; and
communicate the control panel customization options to the requester only if the requester is verified as being permitted to customize the control panel of the printer.

22. One or more computer readable media having stored thereon a plurality of instructions that, when executed by one or more processors, causes the one or more processors to:
receive a request to customize the control panel other printer;
display control panel customization options;
receive one or more control panel customization selections; and save a custom control panel definition for the printer that incorporates the control panel customization selections, wherein the instructions that cause the one or more processors to save the custom control panel definition comprise instructions that cause the one or more processors to save the custom control panel definition in a location expected by the printer to contain a custom control panel definition.

23. One or more computer readable media as recited in claim 22, wherein the plurality of instructions further include instructions that cause the one or more processors to use the received control panel customization selections to generate the custom control panel definition for the printer.

24. A printer comprising:
   a default control panel definition;
   a retrieval module configured to,
      determine whether a custom control panel definition is available for the printer, and
      retrieve the custom control panel definition if it is available for the printer; and
   a display component to display a control panel as defined by the custom control panel definition if the custom control panel definition exists, and otherwise to display a control panel as defined by the default control panel definition.

25. A printer as recited in claim 24, further comprising a customization module configured to receive a request to generate the custom control panel definition and communicate control panel customization options to the requester that allow the requester to generate the custom control panel definition.

26. A printer as recited in claim 24, further comprising a customization module configured to receive a request to generate the custom control panel definition, communicate control panel customization options to the requester, receive one or more control panel customization selections from the requester; and generate the custom control panel definition.

27. One or more computer readable media having stored thereon a plurality of instructions that, when executed by one or more controllers of a printer causes the one or more controllers to:
   check whether a custom control panel definition is available for the printer;
   if a custom control panel definition is available for the printer, then retrieve the custom control panel definition, otherwise retrieve a default control panel definition; and
   display a control panel as defined by the retrieved control panel definition, wherein the instructions that cause the one or more controllers to check whether a custom control panel definition is available for the printer comprise instructions that cause the one or more controllers to check a plurality of locations to determine whether a custom control panel definition exists.

28. One or more computer readable media as recited in claim 27, wherein the plurality of locations include a local location and a remote location.

* * * * *